US008769670B2

(12) United States Patent
Quigley et al.

(10) Patent No.: US 8,769,670 B2
(45) Date of Patent: Jul. 1, 2014

(54) METHOD AND SYSTEM FOR CONFIGURING LOCAL AND REMOTE RESOURCES TO ACCOMPLISH RENDERING OF MULTIMEDIA CONTENT ON DISSIMILAR FORMAT DEVICES BASED ON USER BIOMETRIC DATA

(75) Inventors: Thomas Quigley, Franklin, NC (US);
Alexander MacInnis, Ann Arbor, MI (US); Arya Behzad, Poway, CA (US); Jeyhan Karaoguz, Irvine, CA (US); John Walley, Ladera Ranch, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 112 days.

(21) Appl. No.: 13/539,772

(22) Filed: Jul. 2, 2012

(65) Prior Publication Data

US 2012/0272300 A1    Oct. 25, 2012

Related U.S. Application Data

(63) Continuation of application No. 11/861,219, filed on Sep. 25, 2007, now Pat. No. 8,214,893.

(60) Provisional application No. 60/950,956, filed on Jul. 20, 2007.

(51) Int. Cl.
*G06F 7/04* (2006.01)

(52) U.S. Cl.
USPC ........................................................ 726/21

(58) Field of Classification Search
USPC ................. 726/4–7, 17, 21, 27–29; 713/186
See application file for complete search history.

(56) References Cited

U.S. PATENT DOCUMENTS

| 5,552,806 A | 9/1996 | Lenchik |
| 5,646,608 A | 7/1997 | Shintani |

(Continued)

FOREIGN PATENT DOCUMENTS

| EP | 1045355 | 10/2000 |
| WO | 2005078676 | 8/2005 |

OTHER PUBLICATIONS

U.S. Appl. No. 11/861,219 entitled "Method and System for Configuring Local and Remote Resources to Accomplish Rendering of Multimedia Content on Dissimilar Format Devices Based on User Biometric Data," which was filed on Sep. 25, 2007.
Seagate Technology LLC, Seagate D.A.V.E. (Digital Audio Video Experience) Transform the consumer digital content experience with the Seagate D.A.V.E design concept, Data Sheet, 2007.
Seagate Technology LLC, Seagate D.A.V.E. (Digital Audio Video Experience) The portable storage platform that collects, plays and manages digital content, Product Overview, 2007.
TODAYSTHV.com, KTHV Little Rock (Mind-Reading Toys Wave Of The Future) The Associated Press, Apr. 30, 2007.
International Search Report, PCTIIL 2005/000191, mailed Sep. 9, 2005, 5 pages.

*Primary Examiner* — Beemnet Dada
(74) *Attorney, Agent, or Firm* — Oblon, Spivak, McClelland, Maier & Neustadt, L.L.P.

(57) ABSTRACT

A system and method is provided for communication of information in a mobile communication device (WMCD) configured to network connection may include discovering via a wireless mobile communication device, available communication resources based on acquired biometric data for a user of the WMCD, and communicating multimedia information between the WMCD and one or more of the discovered available resources. The acquired biometric data may include physical and behavioral biometric data to be authenticated and validated by a pattern recognition database. A connection between the WMCD and one or more discovered available resources may be established through linking the acquired biometric data to resources in available local or remote network. The established connection may enable the WMCD to consume or redirect media from the available resources and may be dynamically adjusted and updated based on dynamic sensing of the acquired biometric data in the available network or available resources.

20 Claims, 6 Drawing Sheets

(56) References Cited

U.S. PATENT DOCUMENTS

| | | |
|---|---|---|
| 6,314,297 B1 | 11/2001 | Karl |
| 7,203,486 B2 | 4/2007 | Patel |
| 7,548,981 B1 | 6/2009 | Taylor et al. |
| 7,796,982 B2 | 9/2010 | Mohanty |
| 2006/0265333 A1* | 11/2006 | Gomes et al. .................. 705/57 |
| 2006/0281477 A1 | 12/2006 | Downes |
| 2007/0239991 A1* | 10/2007 | Cheng ........................... 713/186 |
| 2008/0026844 A1 | 1/2008 | Wells |
| 2009/0207252 A1 | 8/2009 | Raghunath |

\* cited by examiner

METHOD AND SYSTEM FOR CONFIGURING LOCAL AND REMOTE RESOURCES TO ACCOMPLISH RENDERING OF MULTIMEDIA CONTENT ON DISSIMILAR FORMAT DEVICES BASED ON USER BIOMETRIC DATA

CROSS-REFERENCE TO RELATED APPLICATIONS/INCORPORATION BY REFERENCE

This application is a continuation of U.S. application Ser. No. 11/861,219, filed Sep. 25, 2007, which makes reference to, claims priority to, and claims the benefit of U.S. Provisional Application Ser. No. 60/950,956 filed on Jul. 20, 2007.

This application also makes reference to:
U.S. patent application Ser. No. 11/862,224 filed on even date herewith; and
U.S. patent application Ser. No. 11/861,220 filed on even date herewith.

Each of the above applications is hereby incorporated herein by reference in its entirety.

FIELD OF THE INVENTION

Certain embodiments of the invention relate to wireless communication. More specifically, certain embodiments of the invention relate to a method and system for configuring local and remote resources to accomplish rendering of multimedia content on dissimilar format devices based on user biometric data.

BACKGROUND OF THE INVENTION

The field of wireless communication has seen dramatic growth over the last few years. Currently, most people use their wireless devices, be it cellular phones, PDA's, laptops, and/or other devices, for various purposes, business and personal, on a constant and daily basis. Society is truly becoming a wireless one. Many wireless solutions have been introduced, and have made tremendous strides into everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits. WPAN may be based on standardized technologies, for example Class 2 Bluetooth© technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a wider range. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS, UMTS, and CDMA2000 may incorporate substantial data capabilities. Most of today's cellular services may include such features as text messaging, video streaming, web browsing, network resources accessing etc.

In short, wireless networks may exist to support wireless mobile communication devices (WMCDs). However, while WMCDs have continued to grow in complexity and capability, these WMCDs still continue to suffer from some major limitations, especially physical limitations and power.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A method and/or system is provided for configuring local and remote resources to accomplish rendering of multimedia content on dissimilar format devices based on user biometric data, substantially as shown in and/or described in accordance to at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for configuring local and remote resources to accomplish rendering of multimedia content on dissimilar format devices. Exemplary aspects of the invention may comprise biometrically authenticating and validating a user's access to a wireless mobile communication device, discovering available networks and resources and establishing a biometric data preference connection between the wireless mobile communication device and selected resources. The biometric data preference connection may be established over a selected one more of the available networks based on user biometric data preference criteria stored in the wireless mobile communication device. Once the biometric data preference link is established, multimedia data may be communicated between the wireless mobile communication device and the selected one or more of the available resources in a local or remote network. The established connection may be dynamically adjusted and updated, based on biometrically authenticating and validating user's biometric data in the network and resource lists. The wireless mobile communication device may communicate utilizing a plurality of wireless protocols.

Figure 1A:
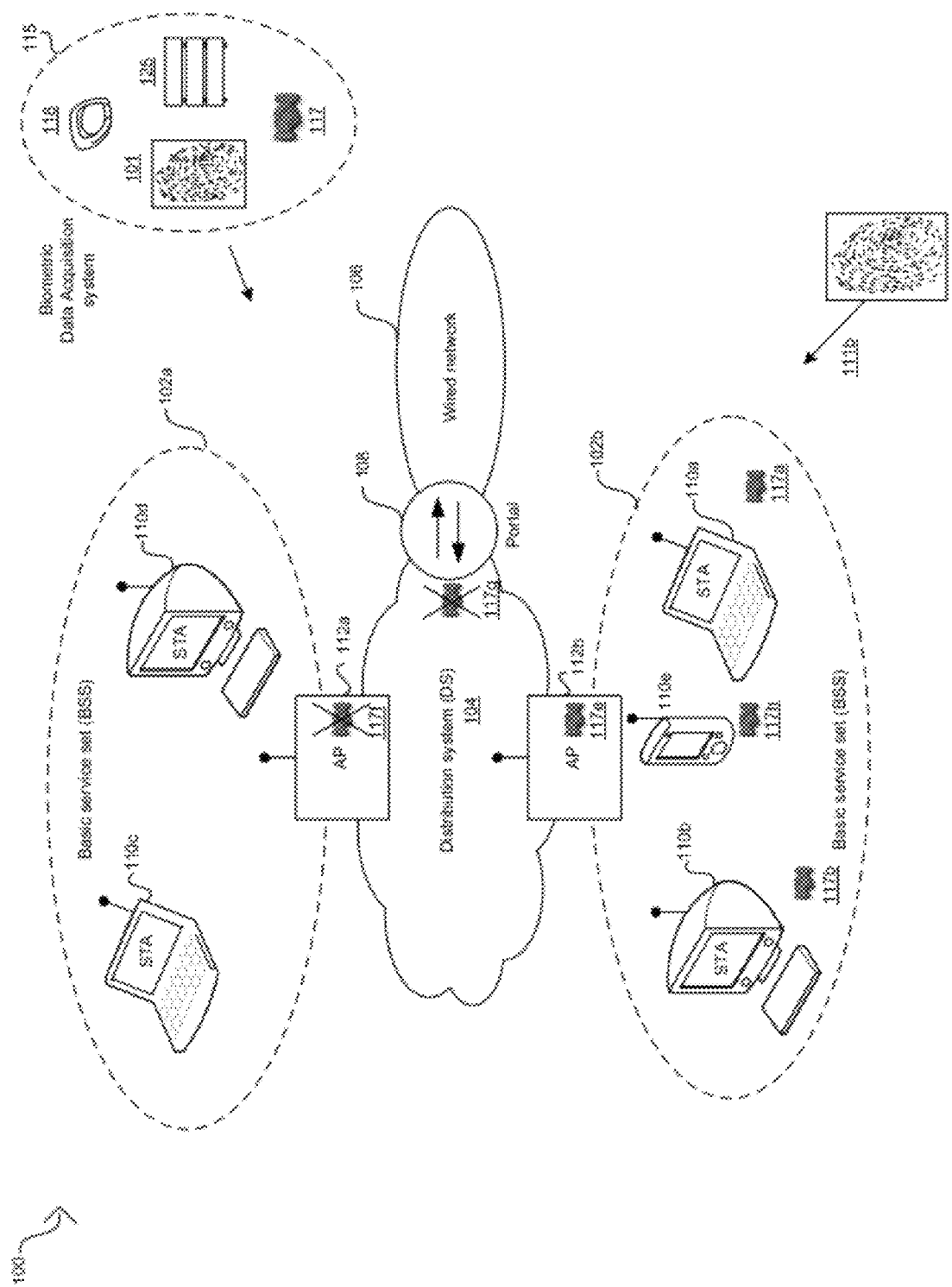
FIG. 1A is a block diagram of an exemplary WLAN infrastructure network comprising basic service sets (BSSs) integrated using a common distribution system (DS) with a biometric data acquisition system, in accordance with an embodiment of the invention.

FIG. 1A is a block diagram of an exemplary WLAN infrastructure network comprising basic service sets (BSSs) integrated using a common distribution system (DS) with a biometric data acquisition system, in accordance with an embodiment of the invention. Referring to FIG. 1A, there is shown an exemplary secure WLAN infrastructure network 100 comprising a first BSS 102a, a second BSS 102b, a DS 104, a wired network 106, a portal 108, a first access point (AP) 112a, a second AP 112b, communication resources such as a plurality of WLAN stations 110a to 110d, a wireless mobile communication device (WMCD) 110e and a biometric data acquisition system 115.

The first and second BSSs 102a and 102b may represent a fundamental building block of the IEEE 802.11 (WLAN) architecture and may be defined as a group of stations that are under the direct control of a single coordination function. The geographical area covered by a BSS is known as the basic service area (BSA). The distribution system DS 104 may be utilized to integrate the BSSs 102a and 102b and may comprise suitable hardware, logic, circuitry, and/or code that may be adapted to operate with edge devices such as switching routers, together with an access network which connects subscribers to their immediate service provider as a backbone network. The BSSs 102a and 102b may be responsible for Medium Access Control (MAC) level transport in the WLAN infrastructure network 100. The DS 104, as specified by the IEEE 802.11 standard, may be implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 may be logically different from the BSSs 102a or 102b and may be utilized only to transfer packets between the BSSs 102a or 102b and/or to transfer packets between the BSSs 102a or 102b and the wired network 106.

The wired network 106 may comprise suitable hardware, logic, circuitry, and/or code that may be adapted to provide wired networking operations. The wired network 106 may be accessed from the WLAN infrastructure network 100 via the portal 108. The portal 108 may comprise suitable hardware, logic, circuitry, and/or code and may be adapted to integrate the WLAN infrastructure network 100 with non-IEEE 802.11 networks. Moreover, the portal 108 may also be adapted to perform the functional operations of a bridge, such as range extension and/or translation between different frame formats, in order to integrate the WLAN infrastructure network 100 with IEEE 802.11-based networks.

The APs 112a, 112b and portal 108 may function as network gateways connecting or directing network traffic from one network to other networks connected to the DS 104. The APs 112a and 112b may comprise suitable hardware, logic, circuitry, and/or code that may be adapted to support range extension of the WLAN infrastructure network 100 by providing the integration points necessary for network connectivity or network traffic between the BSSs 102a or 102b. The WLAN stations 110a to 110d correspond to WLAN-enabled terminals that comprise suitable hardware, logic, circuitry, and/or code that may be adapted to provide connectivity to the WLAN infrastructure network 100 via the APs 112a or 112b.

The WLAN station 110a and 110c may comprise laptop computers and may correspond to a mobile station or terminal within the BSS and the WLAN station 110b and 110d shown are desktop computers and may correspond to a fixed or stationary terminal within the BSS 102a or 102b. The wireless mobile communication device (WMCD) 110e may provide numerous functions including mobile phone and PDA like services. Each BSS may comprise a plurality of mobile or fixed stations and may not be limited to the exemplary implementation shown in FIG. 1A.

The biometric data acquisition system 115 may comprise a biometric sensor 118, acquired biometric data 101 (from user), a pattern recognition database 125 and an authentication and validation procedure 117. Biometric data 101, such as finger print or retina data may be unique to a person. Such biometric data 101 may be classified into two main types: physiological and behavioral biometric data. The physiological biometric data may be related to the physical aspect of the body such as facial features, finger prints, hand shape, iris blood vessel pattern (iris scan) and DNA sequences. The behavioral biometric data may be related to the expression of personality such as Electroencephalogram (EEG) that senses and measures brain wave activities, signature, hand writing and voice. Therefore the biometric data may be representative of the actual person or user. An example of the biometric sensor 118 may be a finger print scanner, an iris scanner, hand scanner, EEG brain wave electrodes or a voice coder.

In an embodiment of the invention, the biometric data authentication and validation procedure 117 may be used as a security measure to prevent unauthorized entry or access to a restricted area and/or data other than by the actual designated person. The authentication and validation procedure 117 may comprise the steps of acquiring the biometric data 101 using a biometric sensor 118, extracting biometric features from acquired biometric data 101, generating a template (digitized pattern) from the biometric data 101, sending the template to enroll in a pattern recognition database 125, storing the template (stored template) as corresponding user's data into the pattern recognition database 125 for future retrieval, matching or comparing a new acquired biometric data 101 (generated template) with the corresponding data as stored template using a pattern recognition database, such as using a known algorithm.

If the biometric data 101 (generated template) and the corresponding data as stored template in the pattern recognition database 125 matches, the user may be authenticated. If the authenticated biometric data 101 matches a security policy permission database, for example, the biometric data 101 may be validated and user's access or entry to communicate with the resources or information may be granted.

In another embodiment of the invention, biometric data 101 may be configured in a user's device preferences to be read by network protocols of a plurality of resources or networks (local and remote). A users' enrolled biometric data may be retrieved for authentication and validation from a pattern recognition database 125 in a local device database, local network database or in a remote network database. A permission may be granted to communicate information between a user and a resource may establish a link or connection. A successful connection may be established through successions of authentication and validation steps that may take place at network traffic junctions such as in a device such as the WMCD 110e, a router and/or a gateway. In another embodiment of the invention, the WMCD 110e may simultaneously function as a wireless router in the BSS 102b.

Upon a successful authentication and validation to the device, the router and/or the gateway, the user's biometric data 101 may be updated or saved into user's preferences linking networks and names of resources along the paths for expedient permission or denial of access for future traffic. The authentication and validation may also detail a data path with an activity log associating to the user's biometric data. The activity log may record and time stamp any transactions or information exchange to identified resources within the networks locally or remotely. The user's preferences may comprise the user's identity (derived from biometric data 101), user's IP address, network addresses, network lists, resource list or resource IP addresses. The actual path or routing of communication between the user and the resource may be dynamic and may change from one route in one time instance to another route in another instance depending on the network traffic condition, the availability of network bandwidth and on the user's physical location and mobility.

A user of the WMCD 110e may wish to utilize one or more home-based resources while within a local network such as the BSS 102b, or the user of WMCD 110e may wish to access other communication resources such as WLAN stations 110c or 110d within another network such as the BSS 102a. An exemplary connection route may comprise WMCD 110e through AP 112b to DS 104 to AP 112a to BSS 102a and to WLAN stations 110c or 110d. The establishment of such a connection route may require a dynamic routing capability, built-in knowledge of user preferences and/or access privileges. The user preferences may comprise a user's biometric data that may be communicated as part of the protocol to gain authentication and validation to connect to different network resources in the BSS 102a, 102b or wired network 106.

The biometric data acquisition system 115 may be configured throughout the WLAN infrastructure network 100. For example, each of the communication resources such as WLAN stations 110a to 110d, the WMCD 110e, and the APs 112a, 112b and portal 108 may be configured to authenticate and validate the biometric data 101 through one or more protocols. In this example, the communication resources WLAN stations 110a, 110b and WMCD 110e within network BSS 102b may be granted access after authenticating and validating biometric data 101 (handshake symbol). In this regard, the denial of access as indicated by references 117f and 117g (no handshake symbol) to the resources in the network BSS 102a and wired network 106. The access denial 117f and 117g may be due to the biometric data 101 either obtain authentication but no validation or the biometric data 101 neither obtain authentication nor validation at AP 112a and portal 108.

Figure 1B:
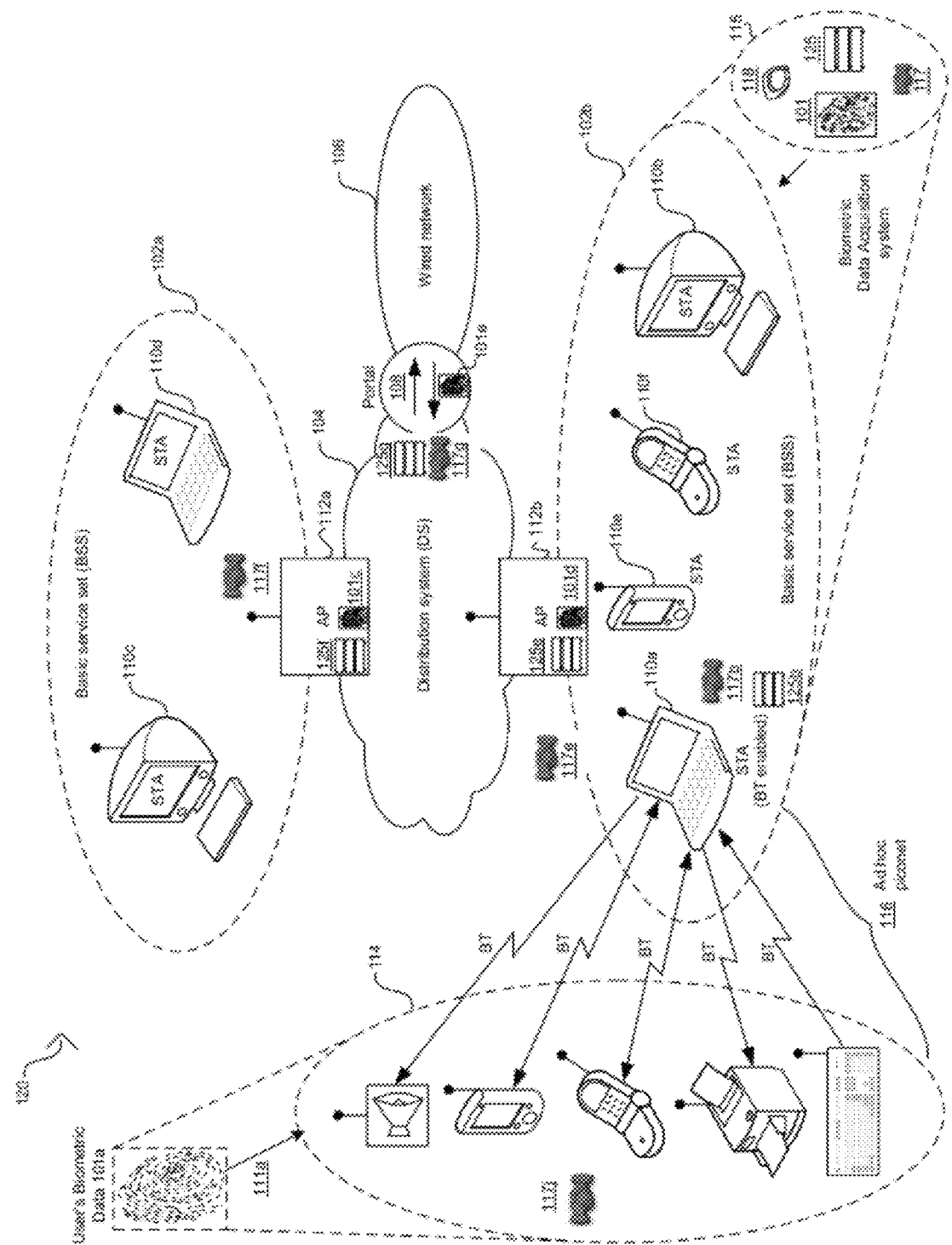
FIG. 1B is a block diagram of an exemplary WLAN infrastructure network comprising a basic service set (BSS) with stations that support WLAN/Bluetooth© coexistence and configured with a biometric data acquisition system, in accordance with an embodiment of the invention.

FIG. 1B is a block diagram of an exemplary WLAN infrastructure network comprising a basic service set (BSS) with stations that support WLAN/Bluetooth© coexistence and configured with biometric data access link, in accordance to an embodiment of the invention. Referring to FIG. 1B, there is shown a WLAN structure comprising a first and second BSS 102a, 102b, a wired network 106 connected together in a distribution system DS 104 through gateways such as AP 112a, 112b and portal 108. The exemplary WLAN infrastructure network 120 differs from the WLAN infrastructure network 100 in FIG. 1A in that at least one BSS comprises at least one station or terminal that supports Bluetooth© technology protocol BT. The second BSS 102b may further form an ad hoc piconet 116 with peripheral devices 114 through Bluetooth© technology protocol BT. The peripheral devices 114 may comprise a keyboard, a mouse, a printer, a mobile phone, a PDA, and/or a set of headphones or speakers, The network in BSS 102b may comprise a plurality of communication resources such as mobile terminals or stations 110b, WMCD 110e such as a Personal Digital Assistant (PDA) or a mobile phone 110f. The laptop computer 110a is now shown to be Bluetooth© enabled. The peripheral devices 114 shown may be part of the Wireless Personal Area Network (WPAN) supported by the Bluetooth© enabled laptop computer 110a. Each of the communication resources within BSS 102b may be configured with a biometric data acquisition system 115 such that each resource may have a biometric sensor 118 to acquire a user's biometric data 101. Accessing the network and device resources, their information or utilizing their functions may require that the user's biometric data 101 be authenticated and validated by respective pattern recognition database within respective device resources, the local network BSS 102b or the remote networks such as BSS 102a or wired network 106.

Generally, the ad-hoc Bluetooth© piconet 116 may comprise a master device or terminal and up to seven slave devices or terminals, each may be activated through user's biometric data 101a and 101b at separate physical locations. In this exemplary implementation, the laptop computer 110a may correspond to as a master Bluetooth© terminal and the peripheral devices 114 may correspond to the slave Bluetooth© devices or terminals. The terminal 110b, PDA 110c and mobile phone 110d may each form its own respective ad hoc Bluetooth© piconet or may become part of the ad hoc Bluetooth© piconet 116 to the master Bluetooth© terminal such as the laptop computer 110a.

Each of the peripheral devices 114 may be configured with a biometric data acquisition system 115 such that each device may have a biometric sensor 118 to acquire a user's biometric data 101a for access privileges. Accessing the peripheral devices 114, their information or utilizing their functions may require that the user's biometric data 101a be acquired, authenticated and validated 117j by, for example, a pattern recognition database 125 stored in the peripheral device 114. Alternately, the pattern recognition database 125 may be securely retrieved remotely through a network.

Peripheral devices in the ad hoc piconet 116 may communicate information with resources in the local network BSS 102b or from the remote networks BSS 102a or the wired network 106 based on the acquired biometric data 101. In another embodiment of the invention, the peripheral devices 114 may grant access privileges to their use, information or functions based on authentication and validation of received biometric data 101a from Bluetooth© protocol BT to the pattern recognition database 125 without the need of a biometric sensor.

The user of the WMCD such as the laptop computer 110a may wish to utilize home-based resources while within an area with multiple wireless or wired networks 102a, 102b, 104 and 106, or the user may wish to access peripheral devices 114 utilizing other wireless protocols within the same area such as the ad hoc Bluetooth© piconet 116. The establishment of such a connection utilizing a single WMCD such as the laptop computer 110a may require a dynamic routing capability. The dynamic routing capability may utilize multi-protocol capability and built-in knowledge of user preferences including authentication and validation 117f, 117e and 117g of user's biometric data 101c to 101e at a plurality of network gateways such as AP 112a, 112b and portal 108 using respective pattern recognition database 125f, 125e and 125g.

Figure 2A:
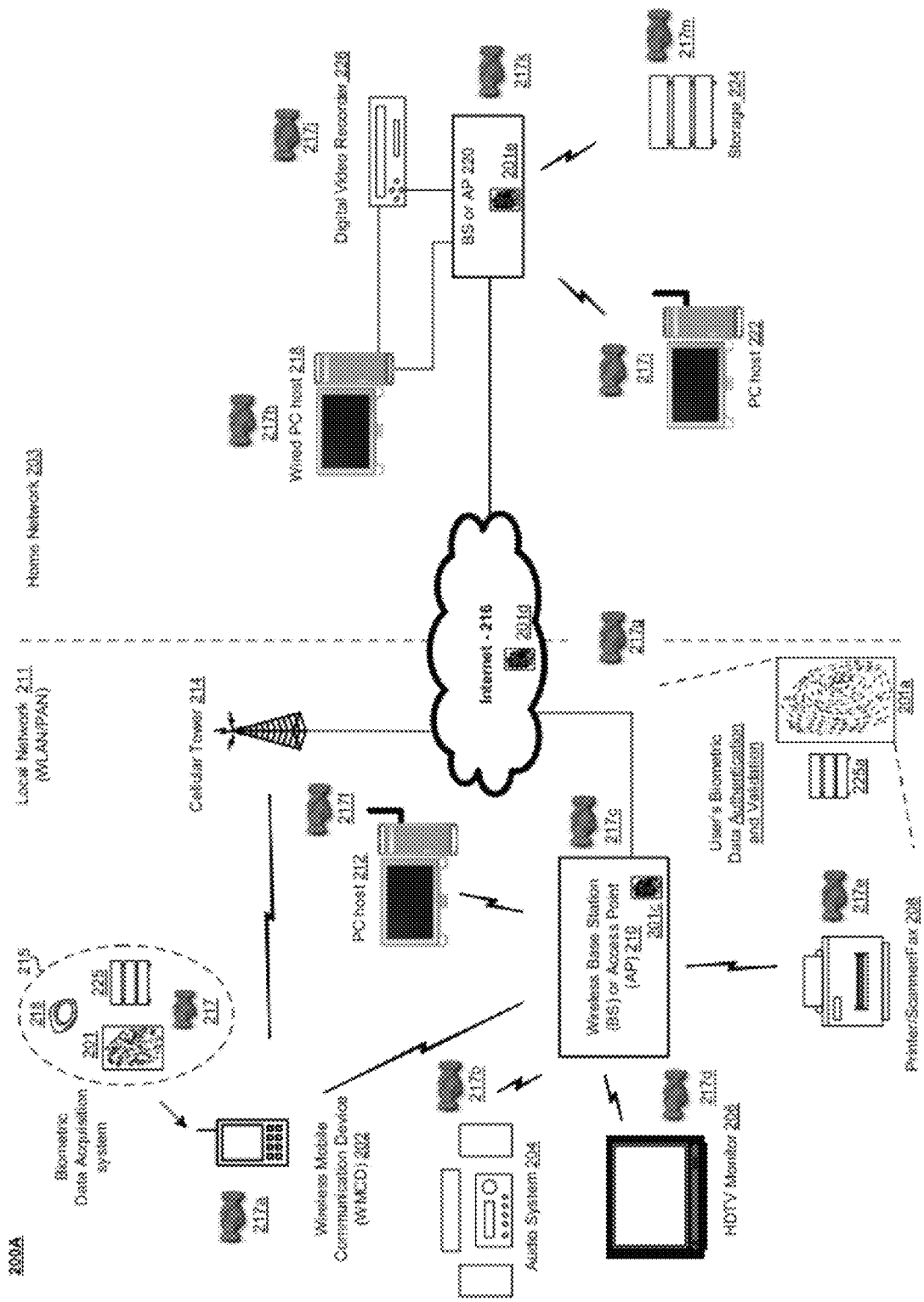
FIG. 2A is a block diagram illustrating a wireless mobile communication device communicating information to available resources based on acquired biometric data, in accordance with an embodiment of the invention.

FIG. 2A is a block diagram illustrating a wireless mobile communication device communicating information to available resources based on acquired biometric data, in accordance with an embodiment of the invention. Referring to FIG. 2A, there is shown a mobile communication device configured an ad hoc network 200A comprising a biometric acquisition system 215 similar to the one described in FIG. 1A, a biometric data enabled local network 211 and a biometric data enabled home network 203. The biometric data enabled local network 211 may communicate with the biometric data enabled home network 203 via the biometric data enabled Internet 216. The biometric data enabled local network 211 may comprise a plurality of resources or devices such as a wireless mobile communication device (WMCD) 202, an audio system 204, an HDTV monitor 206, a printer/scanner/fax 208, a wireless base station or access point 210 and a PC host 212.

Each of the resources or devices within the biometric data enabled local network 211 or the biometric data enabled home network 203 may comprise a biometric data acquisition system 215 where the communication of information among the resources within the local network 211 or with the home network 203 may require the steps of user's biometric data authentication and validation 217a to 217m discussed in FIGS. 1A and 1B. Likewise network traffic authentication and validation 217c, 217k and 217d may require matching the respective biometric data 201c, 201d and 201e with respective pattern recognition database at AP 210, 220c and/or the Internet 216.

The biometric data enabled home network 203 may comprise a plurality of resources or devices such as a wired host PC 218, a PC host 222, a storage 224, a wireless base station or access point 220 and a digital video recorder (DVR) 226. The resources or devices coupled to the biometric data enabled local network 211 and the biometric data enabled home network 203 may be communicatively coupled to their respective base station or access point 210/220 via a wired or wireless connection utilizing one of a plurality of protocols, such as Bluetooth©, wireless LAN 802.11, for example. The number of devices is not limited to the number shown in FIG. 2. Accordingly, any number of networked multimedia input/output resources or devices may be utilized.

The WMCD 202 may comprise a device capable of communicating wirelessly utilizing a plurality of methods and/or protocols and a plurality of networks. In this example, the network communication may be achieved via the cellular tower 214, or the wireless base station AP 210. The WMCD 202 may function as a cellular phone, personal data assistant, and/or a mobile computing device, for example. In addition, the WMCD 202 may function as a router, in that it may configure itself to use and connect to local and remote resources to perform multimedia and communication tasks by auto discovery of local devices and capabilities via standardized network protocols. The user's biometric data 201 may be transmitted as part of the data in the standardized network protocols.

In operation, exemplary local resources or devices such as the audio system 204, HDTV monitor 206, printer/scanner/fax 208, wireless base station or access point 210 and PC host 212 to the mobile device WMCD 202 may announce their capabilities and availability in instances when the WMCD 202 comes in range of them and discovers the wired or wireless network that links them. In another embodiment of the invention, the WMCD 202 may poll for available networks and resources. In this manner, the WMCD 202 may maintain a list of local resources or devices that it may communicate with along with their capabilities.

The WMCD 202 may keep a list of resources available on its biometric data enabled home network 203 and may update that list and the bandwidth capabilities of its connection to the home network 203 via locally available networks 211 at all times. In instances when the user of the mobile device WMCD 202 may wish to accomplish a certain multimedia or communications task, the WMCD 202 may configure the local and remote resources in order to accomplish the multimedia or communications task. The WMCD 202 configuration of local and remote resources may be saved under the user's preferences comprising authenticated and validated biometric data 201, in accordance to the invention.

In one embodiment of the invention, the biometric data enabled home network 203 resources may comprise a powerful PC, such as the wired PC host 218, with large amounts of storage and computing resources, including transcoding capabilities and local digital video storage. In addition, the WMCD 202 may be connected to a wireless network that may comprise an HDTV monitor 206 that may be available for use and have high bandwidth connectivity via the Internet to the home network 203. In another embodiment of the invention, the connectivity in the local network 211 may be a personal area network (PAN) or a wireless personal area network (WPAN) via Bluetooth or ultra wide band (UWB). The WMCD 202, however, has internet capability and could fetch multimedia content over the internet and send it to the HDTV monitor 206 via the available local network 211 wirelessly or via cable. An exemplary biometric data connecting route linking the WMCD 202 communicating information to available resources based on acquired biometric data will be illustrated in FIG. 2B.

Through the steps of user's biometric data authentication and validation 217a to 217m, the WMCD 202 may create an ad hoc network 200A that may be a virtual network comprising resources or devices from the home network 203 to the local network 211. A route may be established where a device based on user's biometric data by configuring both local and remote resources to accomplish rendering of multimedia content on dissimilar format devices.

For example, the WMCD 202 may communicate with the resources in the biometric data enabled home network 203 to facilitate and coordinate tasks and services. Data may be streamed from a home video storage device, such as the DVR 226, for example, through the wired PC host 218 for transcoding to a different display format. The data may be communicated over the Internet 216 to the local network 211 and to the local HDTV monitor 206 for display. The WMCD 202 may also configure the ad hoc network 200A and the audio system 204 to play audio that corresponds to the video playing on the HDTV monitor 206. In this manner, one or more of the available network routes and resources may be discovered for data processing and consumption.

The ad hoc network 200A and connecting of resources described above may be achieved by the WMCD 202 creating and updating its list of local and remote resources via its biometric data linked user preferences whenever network locality changes. The discovery of local resources may be achieved by listening and logging announcement messages that detail resources and their capabilities or by querying new local networks for available resources. One or both of these functions may be accomplished with standardized protocols. In an exemplary embodiment of the invention, WLAN devices may use, for example, beacons or other types of messages to broadcast their capabilities or available resources.

In an exemplary aspect of the invention, the WMCD 202 may be within range of a WLAN, such as the local network 211. The WMCD 202 user may wish to stream video on the HDTV monitor 206 and audio for the video on the audio system 204, both from a data source, such as the storage 224, or the DVR 226, on the home network 203, for example. The WMCD 202 may determine whether the WLAN, the local network 211, may be in its list of accessible networks stored in the user's preferences.

In another aspect of the invention, when the WMCD 202 may not have the local network 211 in its stored database of networks and resources, the WMCD 202 may receive information broadcasted by network 211, such as the network system IP address, which may comprise information about the wireless protocol, speed and access rights, for example. Such access rights to the biometric data enabled local network 211 may be granted after the WMCD 202 user's biometric data may be enrolled and stored into the network's database as among the approval list.

Figure 2B:
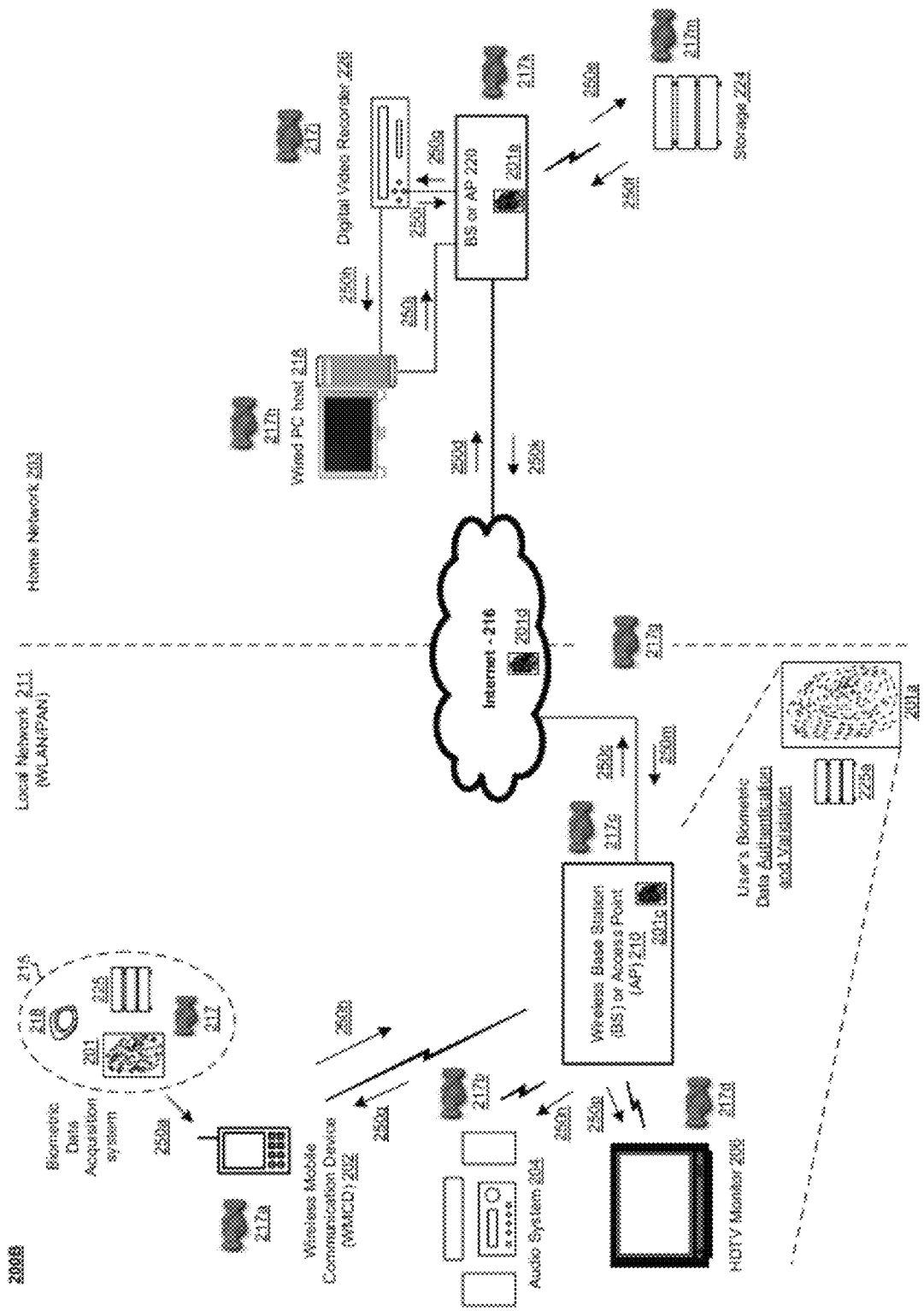
FIG. 2B is a block diagram illustrating an exemplary biometric data connecting route linking a wireless mobile communication device communicating information to available resources based on acquired biometric data, in accordance with an embodiment of the invention.

FIG. 2B is a block diagram illustrating an exemplary biometric data connecting route linking a wireless mobile communication device communicating information to available resources based on acquired biometric data, in accordance with an embodiment of the invention. Referring to FIG. 2B, there is shown a biometric data connecting route connecting paths 250a to 250q. The exemplary route may start with path 250a where the WMCD 202 may be biometrically authenticated and validated 217a via a biometric data acquisition system 215. The biometric authentication and validation 217a may be saved into a user preference with available network list and resource list in the WMCD 202.

The WMCD 202 may dynamically establish a biometric data connecting route via path 250b from the WMCD 202, through the AP 210, via path 250c to the Internet 216, via path 250d to the AP 220, via path 250e to the storage 224 and/or via path 250g to the DVR 226, and via paths 250f or 250i respectively to path 250k back to the internet 216 to the local network 211, via path 250m to the AP 210, and via path 250p to the HDTV monitor 206 and via path 250n to the audio system 204.

The user of WMCD 202 may determine that the format of the video stored on the storage 224 and/or the DVR 226 may not be appropriate for the HDTV monitor 206. In this instance, the WMCD 202 may via path 250h direct the video data through the wired PC host 218, which may transcode the video data file to a suitable format to be rendered or displayed on the HDTV monitor 206 via path 250j and respective return paths 250k, 250m, 250p. If the settings of the resources HDTV 206 and audio system 204 may be acceptable, the user of WMCD 202 may update the biometric data linked user preference in the WMCD 202. The updated user preference may store the preferred network list (local network 211 and home network 203), and preferred resource list (audio system 204, HDTV 206, wired PC host 218, storage 224 and DVR 226) with the preferred settings of the aforementioned resources.

Prior to the WMCD 202 dynamically establishing a connecting route starting from path 250b, the WMCD 202 user preferences may not have stored information on the available resources (already authenticated and validated the user's biometric data) in the local network 211 and the home network 203. The WMCD 202 may poll or discover the network 211 and 203 for resources and their characteristics. In this manner, the stored network and resource list in the user preferences may be continuously updated in association with the authenticated and validated biometric data 201 enrolled in the corresponding pattern recognition database 225 via path 250q.

In addition to storing user's biometric data 201 and lists of networks and resources available, the WMCD 202 may also store preferences for dynamic sensing of network and resources availability via path 250q, such as the type of networks the user may have access to, and the preferred protocol to utilize if a plurality of protocols may be available, for example. In instances where the WMCD 202 may be utilizing a cellular network, such as through the cellular tower 214, and the WMCD 202 moves into an area where a WLAN may be available, such as through the AP 210, and the WMCD 202 stored preferences may indicate that the WLAN may be preferred over the cellular network, the WMCD 202 may switch over to the WLAN as shown in FIG. 2A.

The WMCD 202 may build the ad hoc network 200A or 200B based on the user's request for a particular function and the availability of resources. For example, there may be multiple display devices available for consumption in a local network 211, such as the small screen on the WMCD 202 and a larger networked display, such as the HDTV monitor 206. The WMCD 202 may pick the best means of displaying the content based on the bandwidth of the various heterogeneous networks that may be traversed, the requirement and availability of transcoding resources, and the battery power available on the mobile device. In instances where there may be sufficient battery and CPU resources available in the WMCD 202, the WMCD 202 may choose to perform the transcoding functions locally. In instances where transcoding may not be available, the WMCD 202 could display the content on its device display.

In another embodiment according to the invention, the biometric sensor 218 may comprise EEG brain wave electrodes and the pattern recognition database 225 may store user's brain wave activities as signature. The user's brain wave activities may further be mapped to another database associating the user to certain tasks or activities the user may want the WMCD 202 to perform. One example of such task may be to watch channel multimedia on the HDTV 206 in a hotel room while using the DVR 226 and wired PC host 218 in a remote home network 203 to transcode video data under the WMCD 202 EEG biometric data linked preferences. The user may interrupt, switch or select different tasks or activities by using mental control based on EEG biometric data sensing.

In another embodiment according to the invention, the biometric data 201, 201a, 201c, 201d and 201e may be from many sources at the same time. For example one form of biometric data is simply recognizing "who" is accessing the device, but could include who else is in the vicinity (facial, fingerprint, EKG, etc) and discerning the mood of each of the users in the networks 211 and 203. In another implementation of biometric data 201, linking preferences may be based on "learned biometric data". Such learning may comprise using the biometric data 201 to extract information into the data base 225, for example, sensing the mood of the user when responding to a news article to prioritize other data of that type.

Figure 3A:
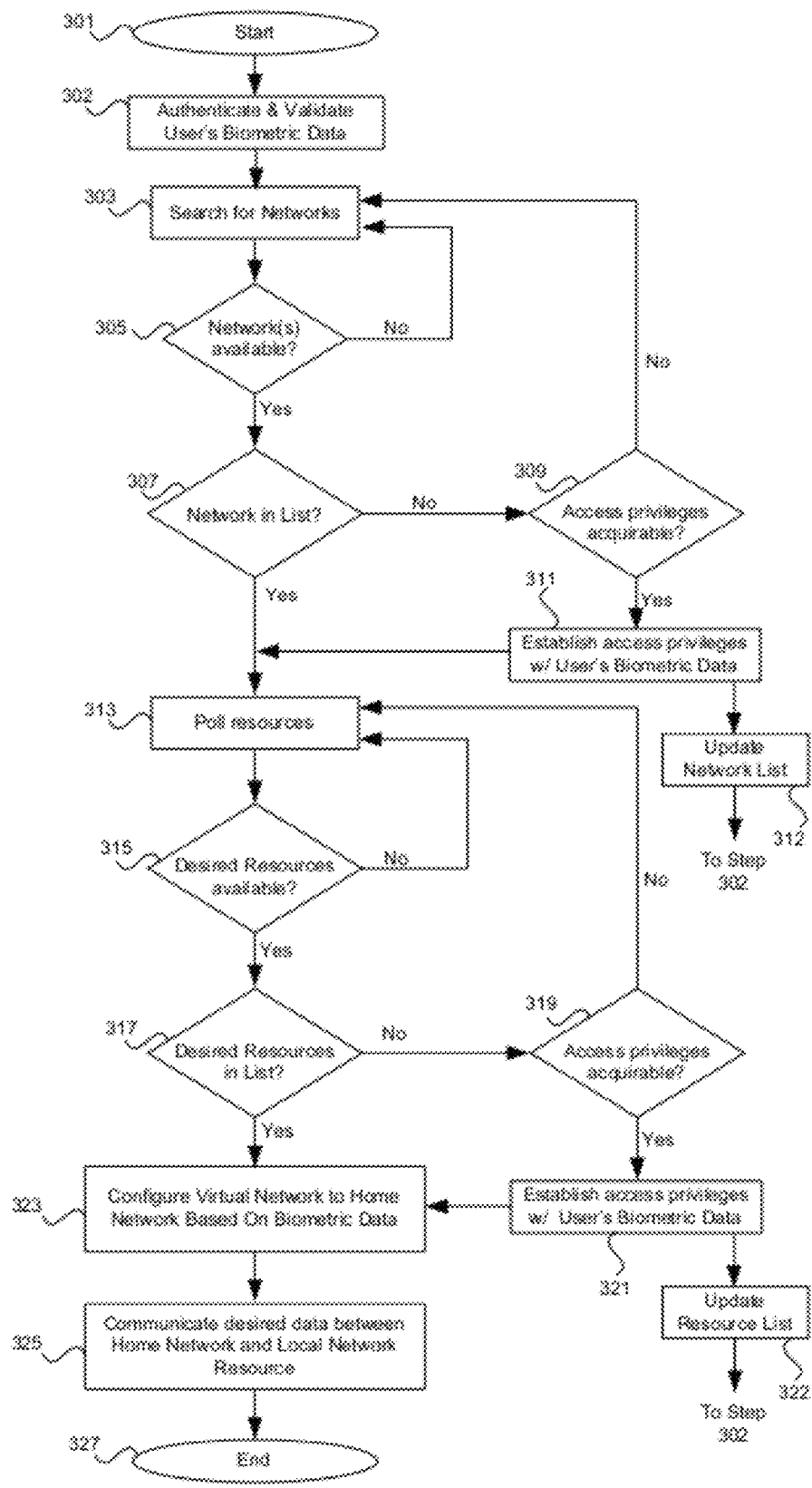
FIG. 3A is a flow diagram illustrating exemplary steps for the communication of information between a wireless mobile communication device to network communication resources based on acquired user's biometric data, in accordance with an embodiment of the invention.

FIG. 3A is a flow diagram illustrating exemplary steps for the communication of information between a wireless mobile communication device to network communication resources based on acquired user's biometric data, in accordance with an embodiment of the invention. Referring to FIG. 3A following start step 301, in step 302 authenticate and validate user's biometric data. User's acquired biometric data 201 may be authenticated and validated 217 by matching to a pattern recognition database 225.

In step 303, a search may be done to locate networks. In this regard, the WMCD 202 may search for an available network such as ad hoc piconet 116, or ad hoc networks 200A or 200B comprising a local network 211 or a remote home network 203. If, in step 305, none are available, the WMCD 202 may step back to step 303 and continue to poll for available networks via path 250$q$. If one or more networks are available, in step 307, the WMCD 202 may through a user's preference on WMCD 202, link user's biometric data to determine whether the network may be in a stored list of preferred networks.

If the one or more found networks are not in the stored list, the process may proceed to step 309 where the WMCD 202 may determine if access privileges may be acquirable. The determination may be based on, for example, the network's traffic condition or a successful network protocol established with a routing device such as the WMCD 202, gateways such as AP 210, AP 220 or a distribution system such as internet 216. If, in step 309, access privileges may not be acquirable in those networks, the process may return to step 303 to search further for next available networks. If access privileges are not acquirable, in step 311, access privileges may be established using a user's biometric data. Access privileges may be established by a process of authentication and validation 217*c*, 217*g* or 217*k* based on user's biometric data 201*c*, 201*d* or 201*e* described in FIG. 1A.

In step 312, the network list may be updated in step 313, resources may be polled or otherwise discovered. In step 312, the available network list may be updated and added to the database of stored list (access privileges granted) in user's preferences. If the one or more found networks are in the stored list, the process may proceed to step 313 where the WMCD 202 may poll for available resources. The available resources may comprise an HDTV monitor 206, an audio system 204, a printer/scanner/fax 208, or other computing and/or multimedia devices such as a PC host 212, for example. If, in step 315, no resources are found, the process may return to step 313 where the WMCD 202 may continue to poll available resources. If one or more resources may be found in step 315, the process may proceed to step 317.

If, in step 317, the found resources are not found in a stored desirable or preferred list of resources, the process may proceed to step 319, where the WMCD 202 may determine if access privileges to the resources are acquirable. The desirable or preferred list of resources may be linked to a user's preference based on for example user's biometric data. If access privileges to the resources are not acquirable, the process may return to step 313, where the WMCD 202 may continue to poll for available resources.

If, in step 319, access privileges may be acquired for the one or more available resources, the process may proceed to step 321 where the WMCD 202 may establish access privileges based on user's biometric data and update resource list in step 322. In step 321, access privileges may be established by a process of authentication and/or validation 217*b*, 217*d*, 217*e* or 217*f* based on user's biometric data 201, 201*a* or 201*c* in a pattern recognition database 225, 225*a*, 224 stored locally in the resources, in the local network 211 or in the remote home network 203 respectively. In step 322, the available resource list may be updated and added to the database of stored list (access privileges granted) in user's preferences in step 302.

If, in step 317, one or more desired or preferred resources are found in a stored list of resources, or after establishing new resources with access privileges in step 321, step 323 may be followed. In step 323, configure virtual network such as ad hoc piconet 116, ad hoc network 200A or 200B to home network based on biometric data, where the virtual network between the home network 203 and the local network 211 may be established. The WMCD 202 may configure a virtual network from a local network 211 to a home network 203 and then proceed to step 325 for the communication of data between local network 211 and home network 203 resources based on biometric data, followed by end step 327.

Figure 3B:
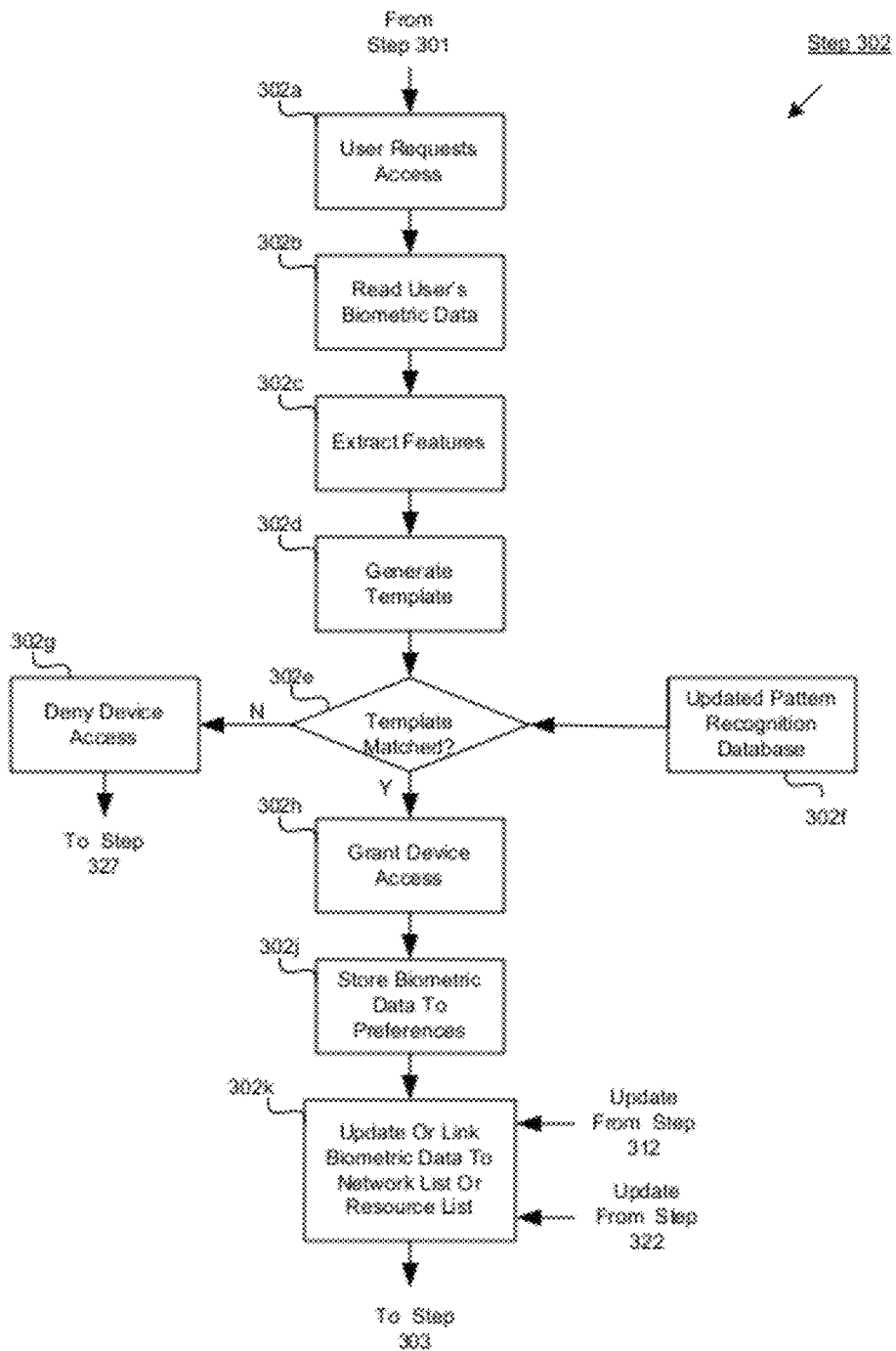
FIG. 3B is a flow diagram illustrating exemplary steps for storing and linking authenticated and validated user's biometric data to user's preferences, in accordance with an embodiment of the invention.

FIG. 3B illustrates exemplary steps for storing and linking authenticated and validated user's biometric data to user's preferences, in accordance with an embodiment of the invention. FIG. 3B describes exemplary steps in reference to step 302 of FIG. 3A. In an embodiment of the invention, step 302 may comprise the steps of authenticating and validating biometric data, storing and linking user's biometric data to user's preferences for discovering and accessing available network list or resource list in the network.

In step 302*a*, a user may request access. A user may request access to a device such as a WMCD 202. In step 302*b*, user's biometric data may be acquired such as by reading. In an exemplary embodiment of the invention, a biometric sensor 218 may acquire user's biometric data 201 by, for example, scanning and digitizing the user's finger print or the user's face. In step 302*c*, user features may be extracted. The biometric data 201 may be processed using a biometric data algorithm to extract the user's features. In step 302*d*, a template may be generated with characteristic features of the user.

In step 302*e*, the WMCD 202 may retrieve corresponding data as stored templates from a pattern recognition database in step 302*f* to match the user's generated template. In step 302*f*, a pattern recognition database may be updated. The pattern recognition database may be built up by enrolling one or more user's biometric data. Access preferences to each individual user may be set by a security policy determined by a database administrator. The database may be updated in enrollment or in access preferences. In instances where no match is found, in step 302*g*, device access may be denied. Subsequent to step 302*g*, the exemplary steps may then terminate at step 327. Although not shown, the user may request one or more subsequent accesses by rescanning user's biometric data into the WMCD 202 and reinitiate the biometric data acquisition process at step 302*a*.

If, in step 302*e*, the template matched, then in step 302*h*, device access may be granted. If user's generated template matches stored template in the pattern recognition database, the user may be authenticated and/or validated. The user may be granted permission to access the WMCD 202. In step 302*j*, biometric data may be stored to preferences. Upon authentication and/or validation of the user, the user's biometric data 201 may be stored into the preferences of the device WMCD 202. In step 302*k*, the biometric data may be update and/or linked to network list and/or resource list. The acquired user's biometric data may be stored and linked to the device preferences. The device preference may comprise listings of preferred networks and listings of preferred resources forming a biometric data connecting route comprising exemplary paths 250a to 250q to connect the preferred resources in the preferred network. In step 312, updates to the network list or the resource list may be received from steps 312 or 322 where additional available networks and/or devices may be discovered based on user's biometric data authentication and/or validation.

The steps of the process in FIGS. 3A and 3B may be rearranged in a different order or substituted with similar or equivalent operation to accomplish the same results of information communication between a WMCD to network communication resources without departing form the scope and spirit of the invention.

In accordance with various embodiments of the invention, the method for communication of information in a mobile communication device configured network connection 200 may comprise discovering via a wireless mobile communication device WMCD 202, available communication resources such as network device resources 204, 206, 208, 212, 218, 222, 224 or 226 based on acquired biometric data 201 for a user of the WMCD 202 and communicating multimedia information between the WMCD 202 and one or more of the discovered available resources 204, 206, 208, 212, 218, 222, 224 or 226.

The method may comprise authenticating and validating 217 the acquired biometric data 201 to a pattern recognition database 225. The acquired biometric data 201 may comprise physical and behavioral biometric data. A biometric data connecting route between the WMCD 202 and one or more discovered available resources 204, 206, 208, 212, 218, 222, 224 or 226 may be established through linking the authenticated and validated user's biometric data 201 to a network list and a resource list. The network list may comprise one or more available networks such as a biometric data enabled ad hoc piconet 116, or ad hoc networks 200A or 200B. The resource list may comprise one or more discovered available resources 204, 206, 208, 212, 218, 222, 224 or 226.

The established connection may enable the WMCD 202 to consume or redirect media from the discovered available resources 204, 206, 208, 212, 218, 222, 224 or 226 in a local network 211 or remote home network 203. The method may enable the user to update the availability to the networks 211 or 203 and resources 204, 206, 208, 212, 218, 222, 224 or 226 based on dynamic sensing of the user's biometric data 201.

Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method, comprising:
acquiring biometric data in a wireless mobile communication device (WMCD);
determining whether the acquired biometric data corresponds to a user of the WMCD;
discovering available communication resources within range of the WMCD;
determining whether the available communication resources correspond to user preferences associated and linked with the biometric data of the user; and
communicating multimedia information between the WMCD and one of the discovered available communication resources.

2. The method according to claim 1, wherein determining whether the acquired biometric data corresponds to a user of the WMCD further comprises authenticating the acquired biometric data for the user of the WMCD.

3. The method according to claim 2, comprising matching the acquired biometric data to corresponding data in a pattern recognition database, wherein the acquired biometric data comprises physiological biometric data.

4. The method according to claim 2, comprising matching the acquired biometric data to corresponding data in a pattern recognition database, wherein the acquired biometric data comprises behavioral biometric data.

5. The method according to claim 1, comprising establishing a connection between the WMCD and the one of the discovered available communication resources.

6. The method according to claim 5, comprising consuming media from the one of the discovered available communication resources on the WMCD via the established connection.

7. The method according to claim 5, comprising redirecting, via the WMCD, media from the one of the discovered available communication resources to a remote device for consumption on the remote device.

8. The method according to claim 5, comprising initiating transcoding of a media item from the one of the discovered available communication resources to a media format compatible with the WMCD.

9. The method according to claim 5, comprising initiating transcoding of a media item from the one of the discovered available communication resources to a media format compatible with a remote device in communication with the WMCD.

10. A system, comprising:
  circuitry configured to acquire biometric data in a wireless mobile communication device (WMCD);
  circuitry configured to determine whether the acquired biometric data corresponds to a user of the WMCD;
  circuitry configured to discover available communication resources within range of the WMCD;
  circuitry configured to determine whether the available communication resources correspond to user preferences associated and linked with the biometric data of the user; and
  circuitry configured to communicate multimedia information between the WMCD and one of the discovered available resources.

11. The system of claim 10, wherein the circuitry that determines whether the acquired biometric data corresponds to a user of the WMCD further comprises circuitry that authenticates the acquired biometric data for the user of the WMCD.

12. The system of claim 11, further comprising circuitry that matches the acquired biometric data to corresponding data in a pattern recognition database, the acquired biometric data comprising physiological biometric data.

13. The system of claim 11, further comprising circuitry that matches the acquired biometric data to corresponding data in a pattern recognition database, the acquired biometric data comprising behavioral biometric data.

14. The system of claim 10, further comprising circuitry that establishes a connection between the WMCD and the one of the discovered available communication resources.

15. The system of claim 14, further comprising circuitry that obtains media from the one of the discovered available communication resources on the WMCD via the established connection.

16. The system of claim 14, further comprising circuitry that redirects, via the WMCD, media from the one of the discovered available communication resources to a remote device for consumption on the remote device.

17. The system of claim 14, further comprising circuitry that initiates transcoding of a media item from the one of the discovered available communication resources to a media format compatible with the WMCD.

18. The system of claim 14, further comprising circuitry that initiates transcoding of a media item from the one of the discovered available communication resources to a media format compatible with a remote device in communication with the WMCD.

19. A non-transitory computer readable storage medium embodying a software program thereon that, when executed by a processing circuit, configures the processing circuit to:
  acquire biometric data in a wireless mobile communication device (WMCD);
  determine whether the acquired biometric data corresponds to a user of the WMCD;
  discover available communication resources within range of the WMCD;
  determine whether the available communication resources correspond to preferences associated with the user;
  communicate multimedia information between the WMCD and at least one of the available communication resources; and
  determine a media format of a media item available on the at least one of the available communication resources;
  determine whether the media format is compatible with the WMCD; and
  initiate transcoding of the media item to a format that is compatible with the WMCD.

20. The non-transitory computer readable storage medium of claim 19, wherein the processing circuit is further configured to authenticate the acquired biometric data for the user of the WMCD.

* * * * *